Figure 3:
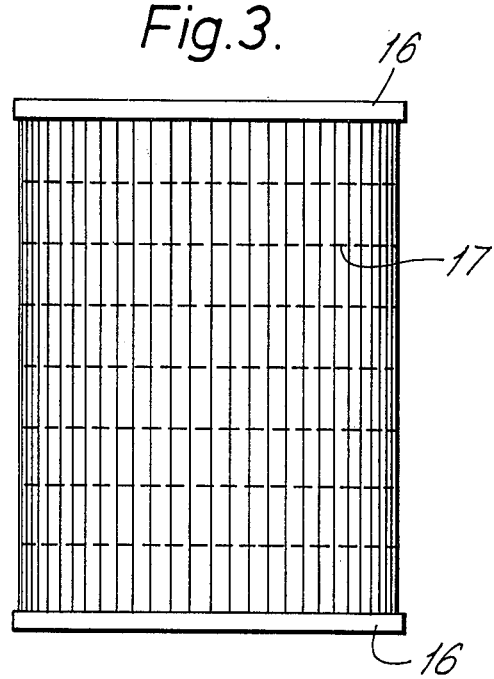

United States Patent [19]
Harris

[11] 4,102,792
[45] Jul. 25, 1978

[54] DISPOSABLE FILTER ELEMENT

[75] Inventor: Frank John Turner Harris, Cheltenham, England

[73] Assignee: Evans, Adlard & Company Limited, Cheltenham, England

[21] Appl. No.: 742,173

[22] Filed: Nov. 16, 1976

[30] Foreign Application Priority Data

Nov. 20, 1975 [GB] United Kingdom ............... 47753/75

[51] Int. Cl.$^2$ ............................................ B10D 27/06
[52] U.S. Cl. ...................................... 210/457; 55/521; 210/493 R
[58] Field of Search .................. 55/521; 210/493, 487, 210/457

[56] References Cited

FOREIGN PATENT DOCUMENT 590,403   1/1960   Canada .................................. 210/493

Primary Examiner—Frank A. Spear, Jr.
Assistant Examiner—Richard W. Burks
Attorney, Agent, or Firm—Larson, Taylor and Hinds

[57] ABSTRACT

Disposable filter for fluids in the form of a ring of pleated filter material provided with continuous lines of corrugations at right angles to the pleats; some of the lines have corrugations of greater height than the other lines.

12 Claims, 5 Drawing Figures

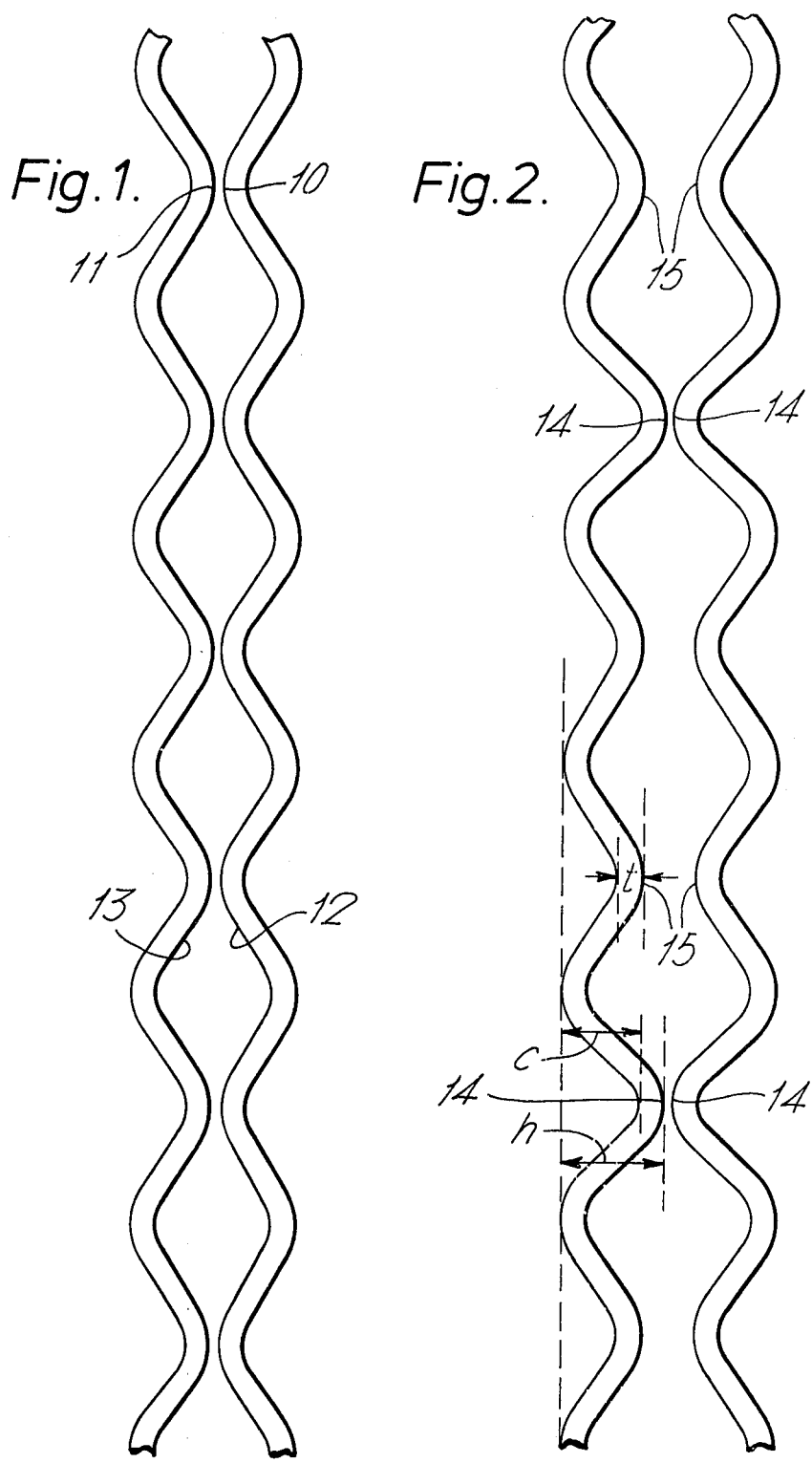

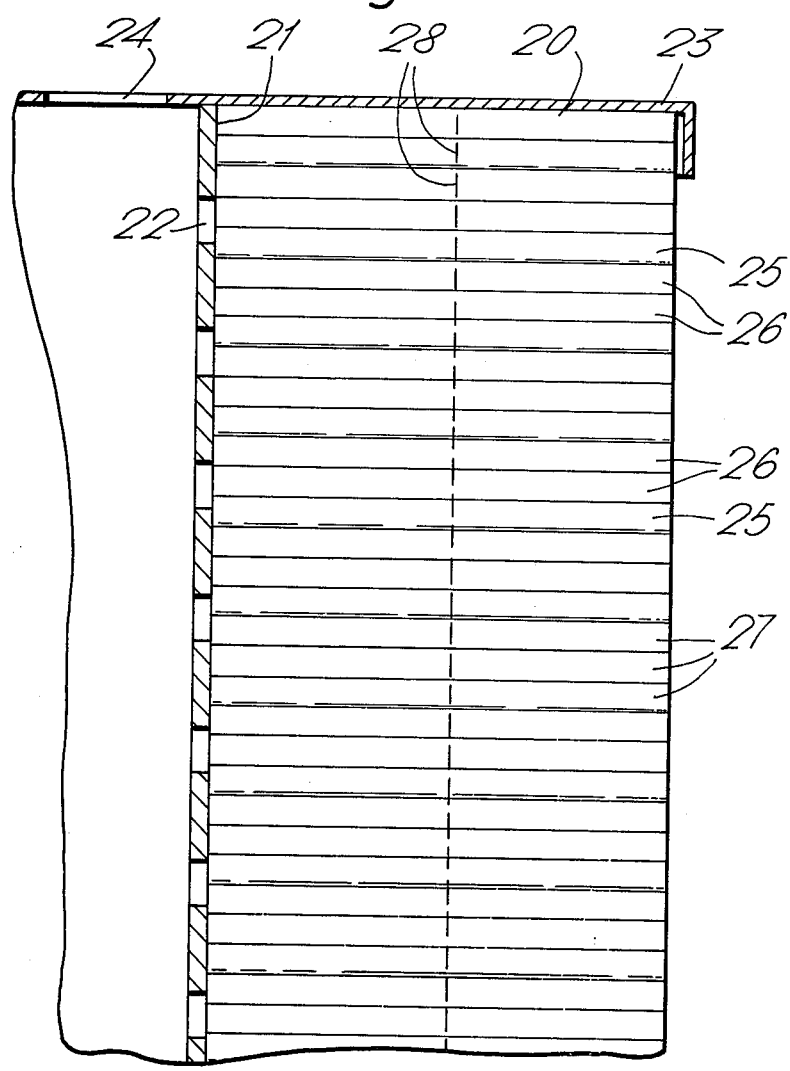

DISPOSABLE FILTER ELEMENT

This invention relates to a disposable filter element for fluids, which element is in the form of a ring of permeable filter material which has been corrugated in a particular manner and pleated. The invention also relates to a strip of the filter material for making the filter element.

A known filter unit comprises a perforated central support tube, a filter element in the form of a ring of corrugated and pleated permeable filter material, e.g. paper, which is wrapped around the tube, and a protective cap or end plate at each end of the tube to retain the filter element in position. The paper has been stiffened by impregnation with a suitable thermosetting resin. Each paper pleat is disposed radially and is closely spaced from adjacent pleats to define narrow radial entry passages for the fluid to be filtered. In use, the fluid enters the passages to pass through the walls of the pleats and the tube perforations and finally escapes axially through an opening in an end cap or plate. It is necessary to keep the pleats apart so as to maintain the entry passages. Attempts to do this have included pleated filter paper which is provided with parallel lines of corrugations or flutes of equal height, opposing crests of the corrugations on adjoining walls of adjacent pleats being arranged to contact one another to form spacer members for the pleats. However, this arrangement can suffer from the following disadvantages. Firstly, the multiplicity of contacting crests considerably reduces the surface area which is available for filtration and this may result in an unacceptable loss of filtration efficiency. Secondly, if deep corrugations are required, the passage of a web of filter paper between a conventional pair of male and female corrugating rolls to corrugate the paper results in high local compressions of the paper at the crests and troughs with a corresponding undesirable reduction in premeability and possible rupture of the paper. Thirdly, high local compression of the paper considerably reduces the paper stiffness at right angles to the lines of corrugations. The present invention avoids or at least minimises these disadvantages.

According to one aspect of the invention, a disposable filter element for fluids comprises a ring of pleated permeable filter material provided with parallel lines of corrugations which extend at right angles to the fold lines of the pleats, wherein a proportion of the lines of corrugations have major corrugations with a height which is greater than that of the corrugations in the other lines of corrugations, whereby major corrugations in adjoining walls of adjacent pleats serve to space them apart.

According to another aspect of the invention, a strip of filter paper formed with transverse fold lines for pleats and with parallel longitudinal lines of corrugations which extend at right angles to said fold lines is characterised in that a proportion of the lines of corrugations have major corrugations with a height which is greater than that of the corrugations in the other lines of corrugations.

Figure 4:
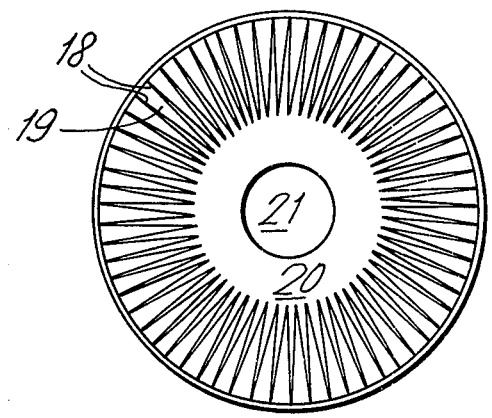

By way of example the invention will now be described with reference to the accompanying diagrammatic drawings of which, FIG. 1 is a section through a portion of contacting surfaces of adjoining pleats of a filter element, FIG. 2 corresponds to FIG. 1 but shows the pleats corrugated in accordance with the present invention, FIGS. 3 and 4 are respectively side and end views of a tubular filter unit incorporating a filter element according to the present invention, and FIG. 5 is a longitudinal section through one half of a tubular filter unit incorporating a different filter element according to the present invention.

In FIG. 1 a corrugated filter material has been pleated. Because the corrugations have the same pitch and height all the crests 10, 11 in ajoining surfaces 12, 13 of adjacent pleats are adapted to contact one another during use of the filter material so as to keep adjacent pleats apart. The resulting multiplicity of contacting crests causes a reduction in the surface area available for filtration which may be unacceptable.

This reduction in the effective surface area is not nearly so marked with the filter material of FIG. 2 where the heights of the corrugations are not all the same. Here every third line of corrugations has a corrugation height which is greater than that of the corrugations in the other lines of corrugations. Only opposing crests 14 of the major corrugations are adapted to contact one another so as to keep adjacent pleats apart, whilst opposing crests 15 of the other or smaller corrugations remain spaced apart.

In FIG. 2 chain lines have been added to illustrate the thickness $t$ of the filter material, the overall height $h$ of a major corrugation and the height $c$ of a minor corrugation which is $h$ minus $t$. It will be seen that the material is so corrugated that the troughs of all the corrugations lie in the same plane $p$.

In a preferred example, the height of the major corrugations is about 0.4 mm whilst the height of the minor corrugations is about 0.2 mm. Preferably there is one line of major corrugations to every three or four lines of minor corrugations.

The filter material is preferably filter paper having a weight in the range of about 82 grammes per square meter to about 210 grammes per square meter, depending on the filtration required.

A filter material may be made and formed into a disposable filter element in the following manner. After manufacture of a filter paper web having the required permeability, the web is coated with a phenolformaldehyde resin and then reeled up to allow the resin to impregnate the paper. The impregnated paper web is then unwound and dried before being passed through a corrugator plant to receive parallel longitudinal lines of corrugations of which every third or fourth line has major corrugations, i.e. corrugations whose height is greater than that of the minor corrugations of the other lines. Durings its passage through the corrugator plant the still warm paper web may be treated with steam before being corrugated. The rolls of the corrugator are so arranged that on the wire side of the paper web the troughs of all the corrugations lie in the same plane. The corrugated paper web is then uniformly pleated about transverse fold lines which extend at right angles to the lines of corrugations and is heated to cure the resin. Subsequently the web is cut into strips ready to be made into annular filter elements.

Referring to FIGS. 3 and 4, a corrugated and pleated paper strip is folded into a cylindrical ring with its pleats of equal depth extending radially. The ends of the strip are secured together, e.g. by adhesive or by clips, and then protective metal caps 16 are fitted over the open ends of the paper ring to complete the assembly of a filter unit. In FIG. 3 the seven chain lines 17 indicate the lines of major corrugations. In FIG. 4 adjacent radial pleats 18 define narrow entry passages 19 for the fluid to be filtered which during filtration passes through the walls of the pleats to enter the central passage 20 and then escapes axially as a filtrate through a hole 21 in one of the caps 16. The crests of only major corrugations 17 serve as spacer members to prevent or at least delay in use the sticking together of adjacent pleats 18.

The above process may be modified in a number of ways. Any other suitable resin may be used. If another thermosetting resin is required, it may be the MY750 epoxy resin marketed by Ciba - Geigy (UK) Limited or the Shell epoxy resin type 828 marketed by Shell Chemicals UK Ltd. of London. If a thermoplastic resin is required it may be an acrylic resin.

The resin may be applied to the wire side only of the filter paper web so that the resin concentration will diminish towards the opposite side. This ensures a higher porosity on the non-wire side which, in the annular filter element, is the outer or "dirty" side which receives the oncoming fluid to be filtered. It also follows that less resin is required by this partial application.

If the filter unit is to be strengthened against end loadings or if the annular filter element requires to be strengthened against inward collapse in use, the unit may incorporate a perforated centre tube surrounded by the filter element and receiving at its ends the caps 16. In which case the troughs of all the corrugations contact the supporting centre tube to permit effective backing support for the filter element.

Referring to FIG. 5 an air filter unit designed for radially inward flow comprises a ring of pleated permeable filter material 20 surrounding a central support in the form of a tube 21 provided with perforations 22 and a pair of end caps 23 at least one of which is formed with an outlet 24.

The filter material is standard air filter paper marketed under the trade reference POSTLIP FF1 by Evans, Adlard & Company Limited of Winchcombe, England. The paper is made by a conventional wet paper process and so has a wire side which is less porous than the other side. The paper web is coated on the wire side only by a phenolformaldehyde resin. After allowing time for impregnation by the resin, the filter paper web is corrugated so as to receive parallel lines of major and minor corrugations 25, 26, the lines of major corrugations 25 being a minor proportion of the total lines of corrugations. The corrugated web is slit into two or more strips which are then pleated about transverse lines at right angles to the lines of corrugations but in this embodiment the pleats are not all of equal depth, each full depth pleat 27 being followed by a pleat of smaller depth 28 so as to provide a continuous series of W formations. The resin is then cured and subsequently the web is cut into strips.

Each of the corrugated and pleated strips is formed into an annular filter element surrounding the central tube 21, the ends of the strip are secured together and then the caps 23 are fitted in position to hold the element in position on the tube.

All the troughs of the filter paper corrugations abut the tube 21 to permit effective support for the filter element. The wire side of the paper 20 is in contact with the tube, i.e. it is on the downstream or "clean" side of the tube, so that the "dirty" side of the paper having the greater porosity faces in use the oncoming air flow to be filtered. Although the paper pleats 27, 28 may be tightly packed together, their W formations allow more area of the paper to be effective for filtration than would be the case if all the pleats were of equal depth. It will be appreciated that the pleats may be formed to provide M formations instead of W formations.

The following two series of comparison tests were made between filter paper having corrugations of similar height and filter paper having major and minor corrugations.

Test 1

POSTLIP FF1 paper was impregnated with a phenolic resin and corrugated to provide a common corrugation height of 0.42 mm. The overall corrugation height was 0.85 mm. Any attempt to increase the corrugation height resulted in splitting or cracking of the paper. After curing the resin at 150° C for 10 mins and conditioning at 23° C with 50% Relative Humidity for 24 hours, the paper was tested and gave the following results.

| | |
|---|---|
| Air resistance(at V = 20m/minute). | 101 Pascal Units of pressure (newtons per square meter). |
| Cross-direction tensile strength. | 1.52 kilonewtons/m. |
| Cross-direction Gurley stiffness (using stiffness tester made by W & L.E. Gurley of Troy, New York, U.S.A.). | 1050 mg. |

Test 1A

The same filter paper similarly treated but corrugated to provide a major corrugation height of 0.39 mm and a minor corrugation height of 0.22 mm was tested and gave the following results.

| | |
|---|---|
| Air resistance (at V = 20m/minute). | 104 Pascal Units |
| Cross-direction tensile strength | 1.84 kilonewtons/m. |
| Cross-direction Gurley stiffness | 1075 mg. |

Although the air resistance increased slightly compared with Test 1, the other characterictics showed improvement despite the differences in height of the major corrugations and the minor corrugations.

Test 1B

The same filter paper treated and corrugated according to Test 1A but having a major corrugation height of 0.70 mm and a minor corrugation height at 0.44 mm was tested and gave the following results.

| | |
|---|---|
| Air resistance (at V = 20m/minute). | 106 Pascal Units |
| Cross-directional tensile strength. | 1.43 kilonewtons/m. |
| Cross-directional Gurley stiffness. | 870 mg. |

These figures show that a considerable increase in the major corrugation height to 0.700 mm was accompanied by a reduction in the tensile strength and stiffness.

Test 2

A heavier grade of POSTLIP filter paper having an increased content of resin was corrugated to provide a common corrugation height of 0.36 mm. After curing and conditioning, the paper under test gave the following results.

| | |
|---|---|
| Air resistance (at V = 20m/minute). | 108 Pascal Units |
| Cross-directional tensile strength. | 5.4 Kilonewtons/m. |

-continued

| | |
|---|---|
| Cross-directional Gurely stiffness. | 2100 mg. |
| Machine direction tensile strength. | 8.6. Kilonewtons/m. |
| Machine direction Gurely stiffness. | 5400 mg. |
| Pore pressure obtained when using a liquid having a surface tension of 26 millinewtons/meter. | 0.94 kilo Pascal Units. |

Any attempt to increase the corrugation height resulted in cracking of the paper.

Test 2A

The same filter paper similarly treated as in Test 2 but corrugated to provide a major corrugation height of 0.62 mm and a minor corrugation height of 0.37 mm under test gave the following results.

| | |
|---|---|
| Air resistance (at V = 20m/minute). | 110 Pascal Units. |
| Cross-directional tensile strength. | 4.5 Kilonewtons/m. |
| Cross-directional Gurley stiffness. | 1900 mg. |
| Machine direction tensile strength. | 8.3. Kilonewtons/m. |
| Machine direction Gurley stiffness. | 6600 mg. |
| Pore pressure obtained when using a liquid having a surface tension of 26 millinewtons/meter. | 1.05 kilo Pascal Units. |

These figures show that an increase in the major corrugation height to 0.62 mm was accompanied by an improved pore pressure (indicating an absence of splits or cracks) at the cost of only a small reduction in some of the other characteristics.

Test 2B

The same filter paper similarly treated as in Test 2 but corrugated to provide a major corrugation height of 0.67 mm and a minor corrugation height of 0.42 mm under test gave the following results.

| | |
|---|---|
| Air resistance (at V = 20m/minute). | about 112 Pascal Units. |
| Cross-directional tensile strength. | 3.4 Kilonewtons/m. |
| Machine direction tensile strength. | 8 Kilonewtons/m. |
| Machine direction Gurley stiffness | 6300 mg. |
| Pore pressure obtained when using liquid having a surface tension of 26 millinewtons/meter. | about 1.01 kilo Pascal Units. |

These figures show that if an increase in the major corrugation height to 0.67 mm was sought it was penalised by a reduction in pore pressure, an increase in air resistance, and a reduction in two of the other characteristics.

These two series of tests illustrate that major and minor corrugations are possible without cracking or splitting of the filter paper provided that the height of the major corrugations does not exceed certain limits.

What we claim is:

1. A disposable filter element for fluids comprising a ring of pleated permeable filter sheet material provided with continuous parallel lines of corrugations which extend continuously along the filter sheet material and at right angles to the fold lines of the pleats, wherein a proportion of the lines of corrugations have major corrugations with a height which is greater than that of the corrugations in the other lines of corrugations, whereby major corrugations in adjoining walls of adjacent pleats serve to space them apart.

2. A filter element according to claim 1, wherein said proportion of the lines of corrugations is a minor proportion of the total number of lines of corrugations.

3. A filter element according to claim 1, wherein lines of major corrugations are spaced apart by three or four of the other lines of corrugations.

4. A filter element according to claim 1, wherein pleats of one depth alternate with pleats of a smaller depth.

5. A filter element according to claim 4, wherein the pleats form a continuous series of W formations.

6. A filter element according to claim 1, wherein the filter material comprises paper.

7. A filter element according to claim 1, wherein the filter material comprises resin-impregnated paper.

8. A filter element according to claim 7, wherein the resin content diminishes towards the outer surface of the paper.

9. A filter element according to claim 7, wherein the height of the major corrugations lies in the range 0.39 mm to 0.62 mm.

10. A filter element according to claim 1 comprising a perforated centre tube, wherein the ring of filter material surrounds and is backed by the centre tube and the troughs of all the corrugations lie in contact with the centre tube.

11. A filter element according to claim 10, wherein the filter material is resin impregnated, wire-formed, paper, said paper having a wire side, and wherein the wire side of the paper is in contact with the centre tube.

12. A strip of filter paper formed with transverse fold lines for pleats and with continuous parallel longitudinal lines of corrugations which extend continuously along the filter paper strip and at right angles to said fold lines, wherein a proportion of the lines of corrugations have major corrugations with a height which is greater than that of the corrugations in the other lines of corrugations.

* * * * *